(12) United States Patent
Arisue et al.

(10) Patent No.: US 8,051,543 B2
(45) Date of Patent: Nov. 8, 2011

(54) COMPOSITE WORKING LATHE

(75) Inventors: Kenji Arisue, Aichi pref. (JP); Naokazu Okabe, Aichi pref. (JP); Yasuhiro Goshima, Aichi pref. (JP); Minoru Kitayama, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 363 days.

(21) Appl. No.: 12/248,919

(22) Filed: Oct. 10, 2008

(65) Prior Publication Data

US 2009/0107310 A1    Apr. 30, 2009

(30) Foreign Application Priority Data

Oct. 31, 2007    (JP) .................................. 2007-282658

(51) Int. Cl.
*B23P 23/00* (2006.01)
(52) U.S. Cl. ........ 29/27 C; 409/201; 409/159; 409/168; 409/224; 82/124
(58) Field of Classification Search ................. 29/27 C, 29/27 R, 33 P, 563; 82/124, 125, 126, 127, 82/117, 165, 153; 409/158–159, 161, 167, 409/172–173, 168, 224, 201, 211, 216; 483/14–15
See application file for complete search history.

(56) References Cited

U.S. PATENT DOCUMENTS

| | | | |
|---|---|---|---|
| 4,899,998 A * | 2/1990 | Teramachi | 269/63 |
| 5,964,016 A * | 10/1999 | Ito et al. | 29/27 C |
| 6,796,012 B2 * | 9/2004 | Geissler et al. | 29/27 C |
| 7,367,929 B2 * | 5/2008 | Feinauer et al. | 483/15 |
| 2002/0194967 A1 * | 12/2002 | Prust et al. | 82/120 |
| 2004/0033768 A1 * | 2/2004 | Diehl et al. | 451/339 |
| 2006/0270538 A1 | 11/2006 | Komizo | |

FOREIGN PATENT DOCUMENTS

| | | |
|---|---|---|
| DE | 102005011306 | 9/2006 |
| EP | 1270144 | 1/2003 |
| EP | 1834719 A1 * | 9/2007 |
| JP | 2003-025169 | 1/2003 |

OTHER PUBLICATIONS

Office Action for corresponding Chinese Application No. 200810149974 dated Apr. 1, 2010. Yue Xifen, "Approaches to the Single-machine Automation of Numerical Control Machine Tools and Technical Problems thereof", Research and Development Department, Nanjing CNC Machine Tool Co., Ltd., Jiangsu, Nanjing 211100, pp. 129-132 (with English translation).
European Search Report for corresponding application No. 08405256.2 completed Nov. 28, 2008.

\* cited by examiner

*Primary Examiner* — Erica E. Cadugan
*Assistant Examiner* — Matthew Beisel
(74) *Attorney, Agent, or Firm* — Renner, Otto, Boisselle & Sklar, LLP

(57) ABSTRACT

The invention provides a composite working lathe capable of improving the efficiency of workpiece machining area by arranging a workpiece handling device below a spindle of the composite working lathe. The composite working lathe 1 comprises a spindle 20 and a tool spindle 30 on a bed 10. A workpiece handling device 40 arranged below the spindle 20 can be moved along a W axis parallel to the axis line $C_1$ of the spindle. The workpiece handling device 40 has a workpiece handling head 50 that pivots in the direction of arrow F around an axis line $C_2$, and grips the workpiece $K_1$ via a gripper 60. The axis line C2 is an axis perpendicular to the vertical plane including the axis line C1 of the spindle 20, and the workpiece handling head 50 is raised for 90 degrees when the gripper 60 receives the workpiece K1 from the spindle 20. The angular position of the workpiece handling head 50 is allocated and the workpiece $K_1$ is machined via a tool $T_1$ on the tool spindle 30.

2 Claims, 5 Drawing Sheets

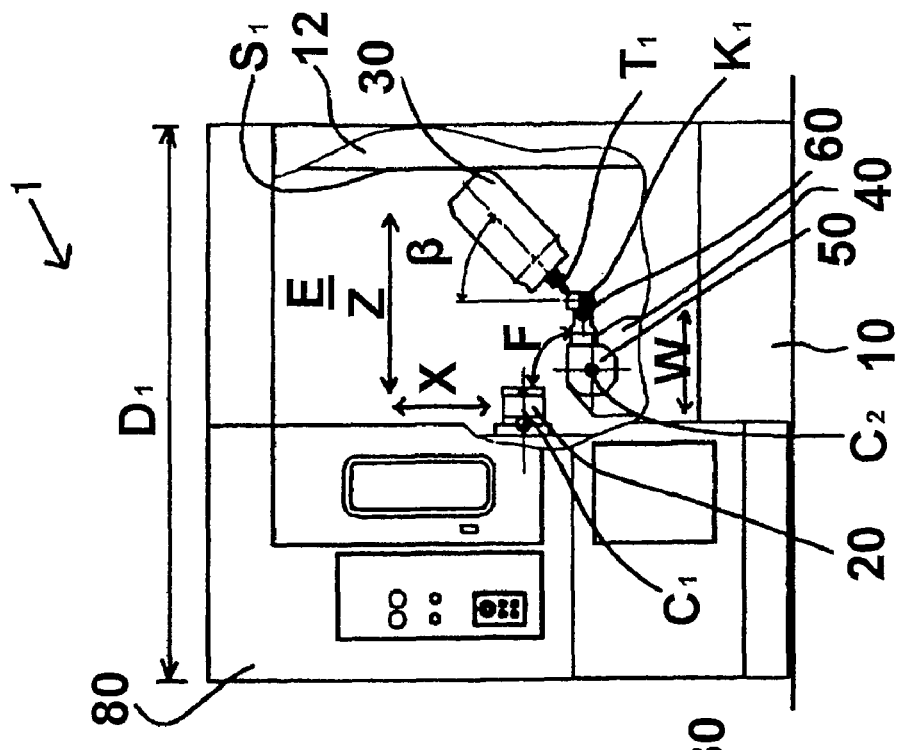
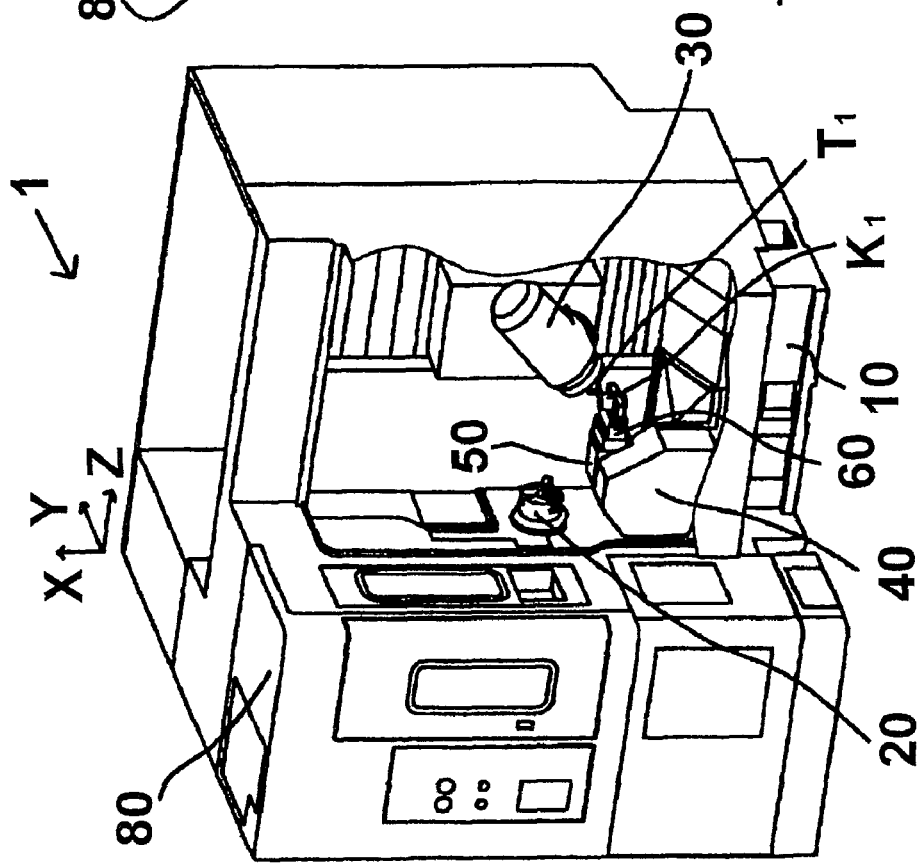
Fig.1A
Fig.1B

Workpiece handling device having a tail stock in addition to a gripper attached on the workpiece handling head

Fig. 5

COMPOSITE WORKING LATHE

The present application is based on and claims priority of Japanese patent application No. 2007-282658 filed on Oct. 31, 2007, the entire contents of which are hereby incorporated by reference.

BACKGROUND OF THE INVENTION

1. Field of the invention

The present invention relates to a compact-sized composite working lathe having a workpiece handling device in addition to a spindle for subjecting workpieces to various machining processes.

2. Description of the related art

Japanese patent application laid-open publication No. 2003-25169 (patent document 1) discloses a composite working lathe having, in addition to a spindle for gripping workpieces, a device for receiving the workpiece from the spindle and subjecting the same to further machining.

The lathe disclosed in the above-mentioned patent document is a device for machining a barlike workpiece, comprising a spindle as first holder for holding the workpiece, and a second holder in addition to a tool rest.

The second holder is arranged on a support that pivots around a vertical axis.

SUMMARY OF THE INVENTION

The object of the present invention is to provide a composite working lathe having a workpiece handling device that pivots around a horizontal axis orthogonal to the vertical plane including the axis line of the spindle, so as to achieve composite machining within a compact-sized machining area.

In order to achieve the above objects, the composite working lathe according to the present invention comprising a tool spindle on which a tool can be attached in exchangeable manner includes a workpiece handling device arranged below a vertical line of the spindle; wherein the workpiece handling device comprises a workpiece handling head that pivots around an axis line perpendicular to the vertical line including the axis line of the spindle, and a gripper disposed on the workpiece handling head for gripping the workpiece.

Further, the tool spindle moves along a Z axis parallel to the axis line of the spindle, an X axis orthogonal to the axis line of the spindle, and a Y axis perpendicular to a plane formed by the Z axis and the X axis, and pivots around a B axis which is a pivot axis perpendicular to the plane formed by the Z axis and the X axis.

Moreover, the workpiece handling device is moved along an axis line parallel to the axis line of the spindle, and the workpiece handling head of the workpiece handling device can be allocated to a plurality of angular positions.

Moreover, the workpiece handling head of the workpiece handling device has a tail stock in addition to the gripper, and a mechanism for allocating the workpiece handling head of the workpiece handling device includes a servomotor and a coupling.

The composite working lathe according to the present invention comprising the above-mentioned means can perform various machining such as cutting, drilling and milling within a relatively small machining area.

Thus, the overall width of the machine can be minimized, and a compact-sized composite working lathe can be achieved.

BRIEF DESCRIPTION OF THE DRAWINGS

FIG. 1A is a perspective view of the composite working lathe according to the present invention, and FIG. 1B is a front view thereof;

FIG. 5 is a schematic representation of an embodiment of the composite working lathe wherein the workpiece handling device includes a tail stock in addition to the gripper attached to the workpiece handling head.

DETAILED DESCRIPTION OF THE PREFERRED EMBODIMENTS

Figure 2B:
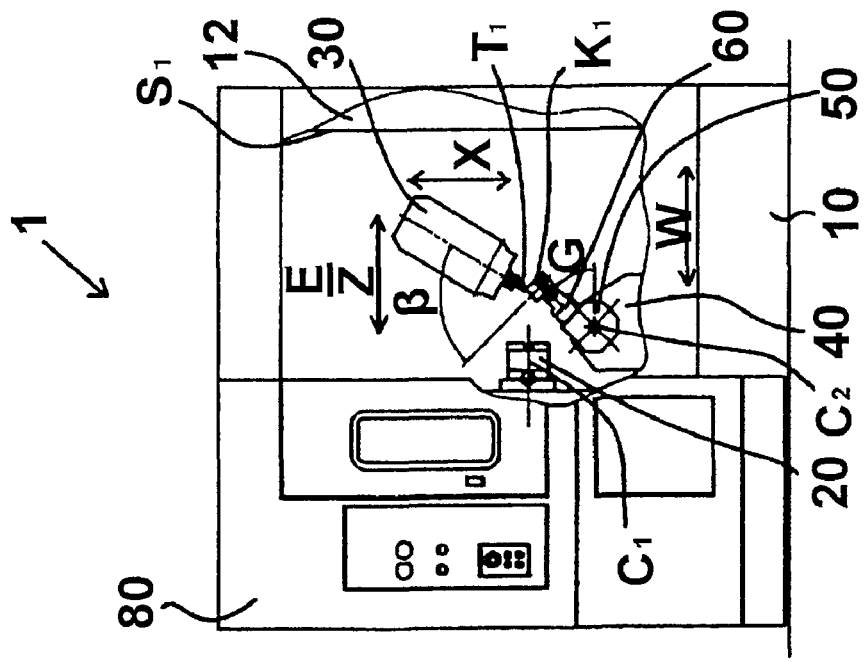
FIG. 2B is a front view thereof.

Now, the structure and function of the composite working lathe according to the present invention will be described with reference to the drawings.

FIG. 1A is a perspective view showing the outline of the composite working lathe according to the present invention, and FIG. 1B is a front view thereof including the front view of the relevant portion of the composite working lathe.

The composite working lathe denoted as a whole by reference number 1 comprises a spindle 20 for holding a workpiece on a bed 10.

A tool spindle 30 arranged to face the spindle 20 is provided with a function to perform machining such as cutting, drilling and milling. According to the present composite working lathe 1, the tool spindle 30 is controlled to move along a Z axis set along an axis line $C_1$ of the spindle 20, and along an X axis orthogonal to the axis line $C_1$ of the spindle 20. Further, the tool spindle 30 is capable of pivoting around a B axis perpendicular to the plane formed by the Z axis and the X axis.

According further to the composite working lathe 1, the tool spindle 30 is also controlled to move along a Y axis orthogonal to the plane including the X axis and the Z axis.

In the present composite working lathe 1, a tool magazine 80 storing exchangeable tools is disposed on the front side of the machine. The tool magazine 80 stores various tools including cutting tools, drilling tools and milling tools, and supplies tools $T_1$ to the tool spindle when necessary.

The operator can monitor the state of machining performed in the machining area, and monitor the tool magazine arranged on the front side of the machine.

Therefore, the operator can visually confirm the tool being exchanged and used in a subsequent process, and to visually confirm the state of the used tool. When the operator finds chips or the like attached to the used tool, the operator can open a door allowing access to the tool magazine so as to clean and maintain the tool.

The operator can visually observe the tool magazine, which is usually arranged out of view of the operator on the upper or rear sides of the machine, so the present lathe has improved operability.

Further, since there is little need to enter the rear side of the machine, a plurality of composite working lathes can be arranged continuously in a row. Thus, space can be used more efficiently by arranging a larger number of composite working lathes in a row.

The composite working lathe 1 according to the present invention has a workpiece handling device 40 disposed below the spindle 20.

The workpiece handling device 40 is arranged below a vertical line of the spindle 20, and is controlled to move along a W axis. The W axis is set parallel to the Z axis, which is the axis of movement of the tool spindle 30.

The workpiece handling device 40 is equipped with a workpiece handling head 50 that pivots along an axis line $C_2$.

The axis line $C_2$ is set as an axis line perpendicular to a vertical plane including the axis line $C_1$ of the spindle 20.

The workpiece handling head 50 has a gripper 60, and receives from the spindle 20 a workpiece $K_1$ having been machined by the spindle 20. Upon receiving the workpiece $K_1$ from the spindle 20, the workpiece handling head 50 pivots so that the gripper 60 faces the spindle 20.

The workpiece handling head 50 pivots in the direction shown by arrow F around the axis line $C_2$. The workpiece handling head 50 pivots via a servomotor, for example, and is clamped at index positions. The index angles can be set so that the index is at every 45 degrees with the horizontal axis line as a reference, for example. At each index position, clamping is performed via a coupling mechanism.

The workpiece handling device 40 can also have a tail stock in addition to the gripper 60 attached to the workpiece handling head 50, as shown in FIG. 5. When a long workpiece K1 is gripped via the spindle 20, the tail stock functions to press the core at the leading end of the long workpiece K1, so as to prevent chattering of the long workpiece during machining and to improve the processing performance.

FIG. 1 shows the state in which the workpiece handling head 50 is allocated so that the gripper 60 of the workpiece handling device 40 is positioned horizontally.

The tool spindle 30 subjects the workpiece $K_1$ having been gripped by the gripper 60 to necessary machining process using tool $T_1$. In the state illustrated in FIG. 1, the tool spindle 30 is set at a position pivoted for a given angle around the B axis. In this state, the axis line of the workpiece $K_1$ and the pivot axis of the tool $T_1$ form an angle β required for machining.

The composite working lathe 1 has a width dimension $D_1$ when seen from the front side.

In the composite working lathe 1, a machining area E is formed between the front end portion of the spindle 20 and the inner side $S_1$ of a cover 12 of the machine main body.

When the tool spindle 30 is moved along the Z axis in the direction separating from the spindle 20, at a certain position, the rear end portion of the tool spindle 30 interferes with the inner wall surface of the cover 12.

Therefore, in the state of FIG. 1, the movement of the tool spindle along the Z axis is restricted within the machining area E.

Figure 2A:
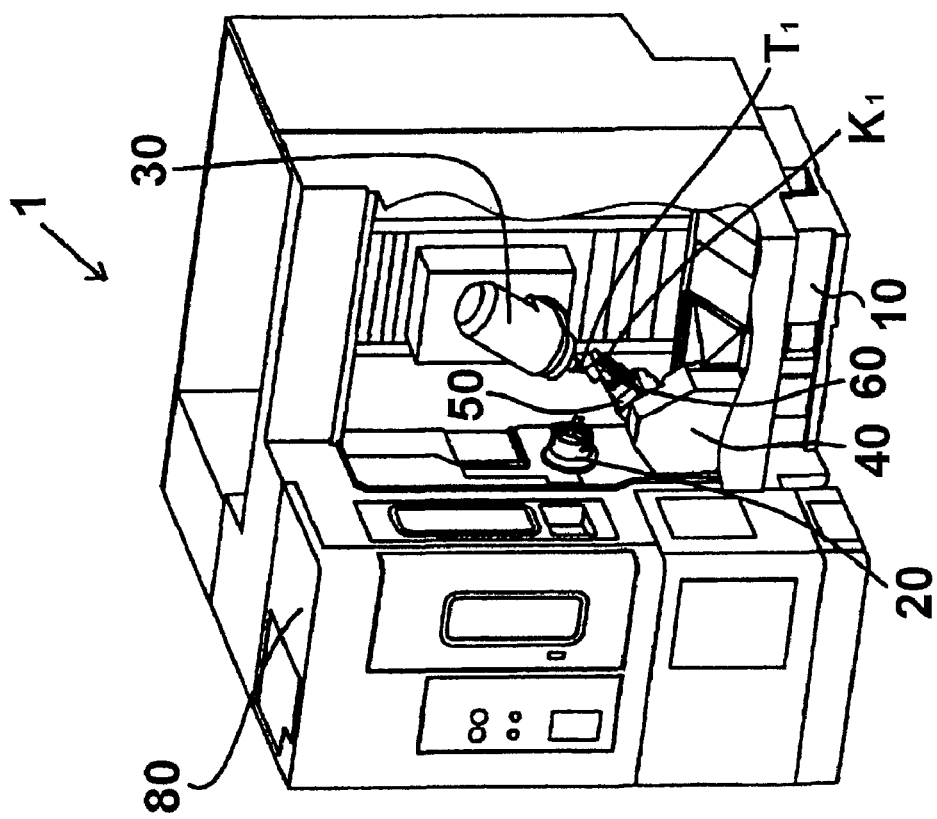
FIG. 2A is a perspective view of the composite working lathe according to the present invention.

FIG. 2 shows a state in which the workpiece handling head 50 of the workpiece handling device 40 is pivoted for 45 degrees from the position where the gripper 60 directly faces the spindle 20 and allocated. Angle G shows the state in which the workpiece handling head 50 is pivoted from the horizontal position. In this position, compared to the state of FIG. 1, the axis line of the tool spindle can be set at a position approximating a vertical axis line by pivoting the tool spindle 30 around a B axis.

In this state, the tool spindle 30 is positioned to be separated from an inner surface $S_1$ of the cover 12, so that a wider area of the workpiece $K_1$ can be subjected to machining within the same machining area E with respect to the angle β formed by the axis line of the workpiece $K_1$ and the pivot axis line of the tool $T_1$.

Figure 3B:
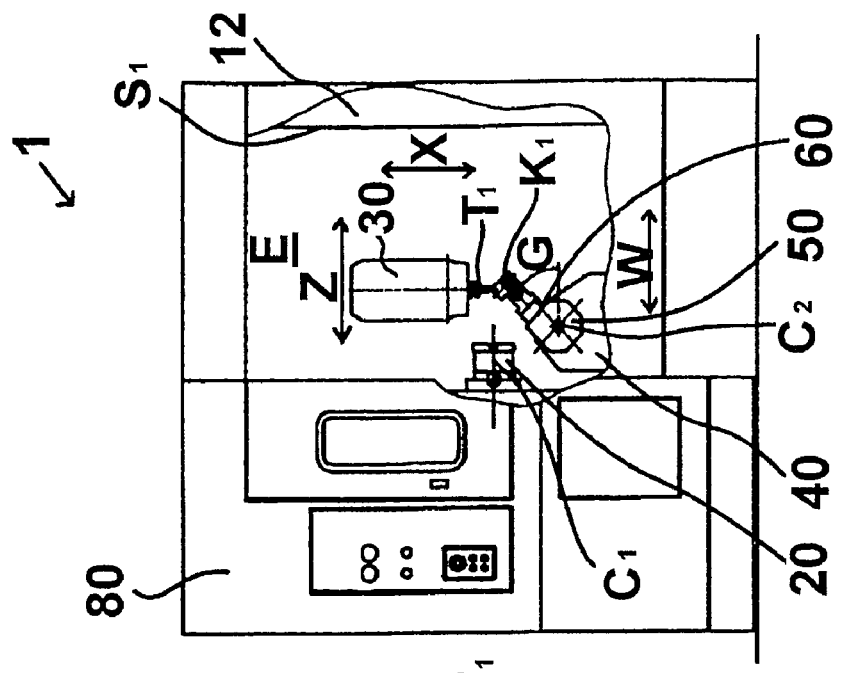
FIG. 3B is a front view thereof.
Figure 3A:
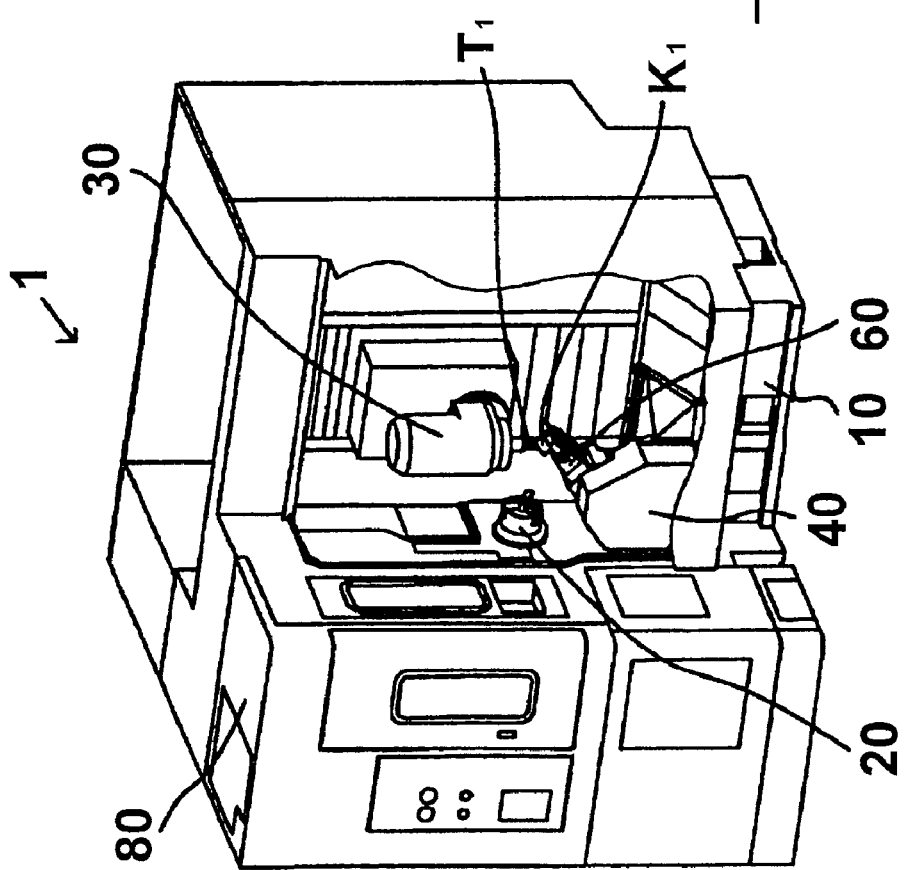
FIG. 3A is a perspective view of the composite working lathe according to the present invention.

FIG. 3 shows a state in which the workpiece handling head of the workpiece handling device 40 is allocated at angle G and pivoted around axis B so that the axis line of the tool spindle is perpendicularly positioned.

Figure 4B:
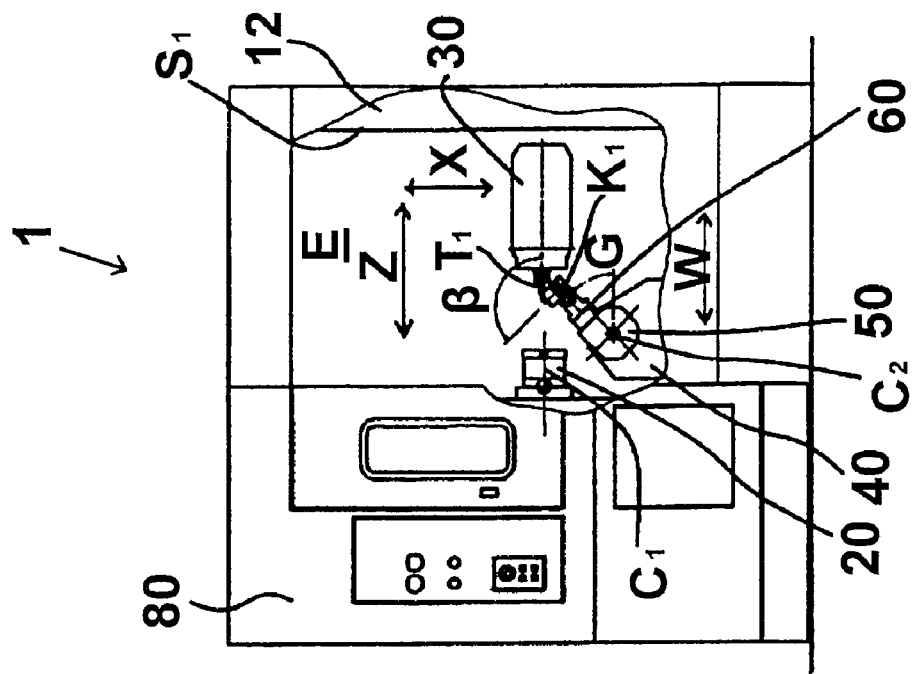
FIG. 4B is a front view thereof.
Figure 4A:
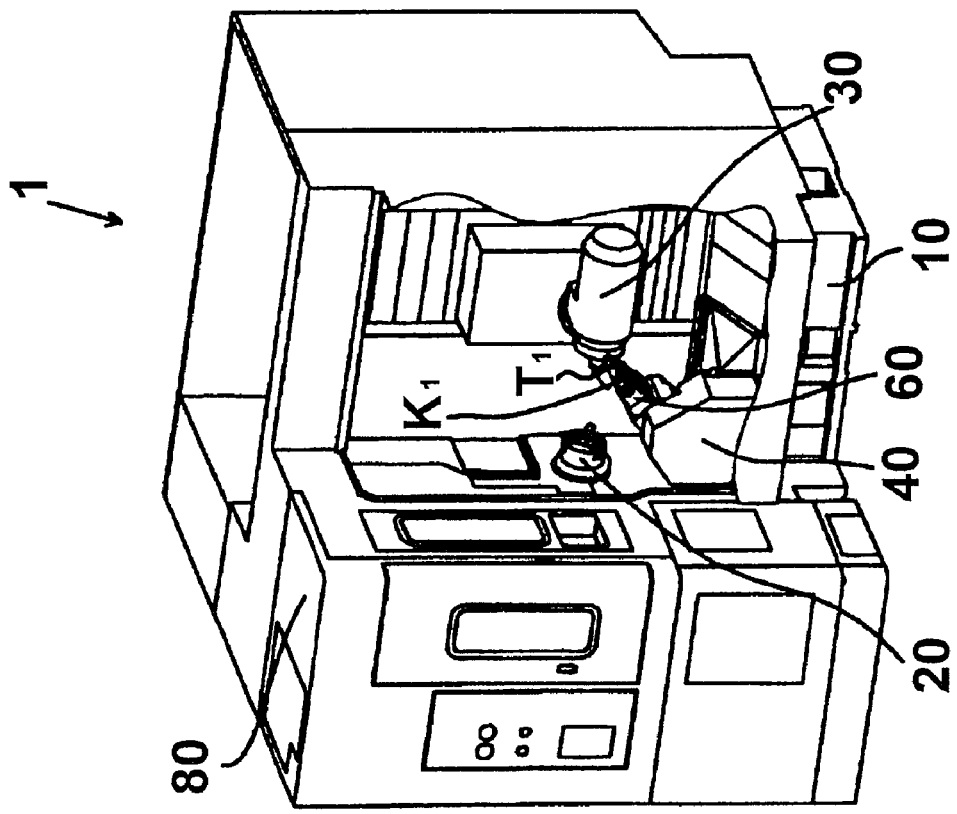
FIG. 4A is a perspective view of the composite working lathe according to the present invention.

FIG. 4 shows a state in which the workpiece handling head of the workpiece handling device 40 is allocated at angle G and pivoted around axis B so that the axis line of the tool spindle 30 is horizontal.

By moving the workpiece handling device 40 toward the spindle 20 on a W axis line, even if the tool spindle 30 is moved from a perpendicular position to a horizontal position within the machining area E, the rear position thereof does not interfere with the inner surface $S_1$ of the cover 12, and a large area can be machined with respect to the angle β formed by the axis line of the workpiece $K_1$ and the pivot axis line of the tool $T_1$.

As described, the composite working lathe of the present invention has a workpiece handling device in addition to the spindle, so that the workpiece having been gripped by the spindle and machined can be transferred to the workpiece handling device and subjected to various machining processes.

Since the workpiece handling device can pivot, the position of the workpiece can be changed arbitrarily and the freedom of machining within a restricted work area can be improved.

Furthermore, the width size of the machine can be cut down, and a compact-sized composite working lathe can be achieved.

What is claimed is:

1. A composite working lathe comprising:
   a workpiece spindle for gripping a workpiece having a rotational axis;
   a tool spindle on which a tool is attached in exchangeable manner, wherein the tool spindle moves along a Z axis parallel to the rotational axis of the workpiece spindle, an X axis orthogonal to the rotational axis of the workpiece spindle, and a Y axis perpendicular to a plane formed by the Z axis and the X axis, and pivots around a B axis which is a pivot axis perpendicular to the plane formed by the Z axis and the X axis;
   a workpiece handling device, wherein the workpiece handling device is moved along a first axis line parallel to the rotational axis of the workpiece spindle and the workpiece handling device comprises:
   a workpiece handling head that pivots around a second axis line perpendicular to a vertical plane, and a gripper disposed on the workpiece handling head for gripping the workpiece, wherein the vertical plane includes the rotational axis of the workpiece spindle, the second axis line is positioned below the rotational axis of the workpiece spindle, and the workpiece handling head of the workpiece handling device is positionable at a plurality of pivot positions in addition to a position for positioning the gripper on the rotation axis of the workpiece spindle.

2. The composite working lathe according to claim 1, wherein the workpiece handling head of the workpiece handling device has a tail stock in addition to the gripper.

* * * * *